United States Patent [19]

Dumont et al.

[11] Patent Number: 5,591,247
[45] Date of Patent: Jan. 7, 1997

[54] AGGLOMERATED PRODUCT WITH PAPER FIBERS

[75] Inventors: Philippe Dumont, Auderghem; Robert Goffin, Trooz, both of Belgium

[73] Assignee: Lhoist Recherche et Developpement S.A., Belgium

[21] Appl. No.: 232,103

[22] PCT Filed: Oct. 30, 1992

[86] PCT No.: PCT/BE92/00047

§ 371 Date: Jul. 25, 1994

§ 102(e) Date: Jul. 25, 1994

[87] PCT Pub. No.: WO93/09257

PCT Pub. Date: May 13, 1993

[30] Foreign Application Priority Data

Oct. 30, 1991 [BE] Belgium .............................. 09101000

[51] Int. Cl.$^6$ .............................. C22B 1/243; C22B 7/02
[52] U.S. Cl. .............................. 75/329; 75/961
[58] Field of Search .............................. 75/313, 321, 323, 75/767, 768, 329, 961

[56] References Cited

U.S. PATENT DOCUMENTS

| | | | |
|---|---|---|---|
| 2,865,731 | 12/1958 | Crowe | 75/767 |
| 4,075,027 | 2/1978 | Knill et al. | 106/99 |
| 4,093,448 | 6/1978 | Eliseev | 75/768 |
| 4,336,218 | 6/1982 | Kaas et al. | 264/111 |

FOREIGN PATENT DOCUMENTS 1243880 7/1967 Germany .

*Primary Examiner*—Melvyn Andrews
*Attorney, Agent, or Firm*—Charles D. Gunter, Jr.

[57] ABSTRACT

A conglomerated material based on metallurgical by-products and characterized in that it contains 2–10% of fibers, 9–25% wt of an alkaline earth metal hydroxide, and % wt of water.

4 Claims, No Drawings

AGGLOMERATED PRODUCT WITH PAPER FIBERS

The present invention relates to an agglomerated product containing, among others, fibers and a calcium derivative.

Document EP-A-0,272,242 describes an agglomerated product containing CaO and from 0.5 to 10% by weight of cellulose fibers as binder. According to this document the use of fibers makes it possible to increase, on the one hand, the resilience of the agglomerated product and, on the other hand, the reactivity of the agglomerated product.

Tests carried out by the Applicant have shown that an agglomerated product containing metallurgical dust and fibers exhibited a better resilience than an agglomerated product containing only metallurgical dust.

Metallurgical dust is intended to mean dust originating from industries or techniques which ensure the manufacture or the use of metals, it being possible for this dust to be metallic or otherwise, originating from ferrous or nonferrous metals.

Unexpectedly, the Applicant has noticed that it is possible to increase further the resilience of an agglomerated product containing metallurgical dust and fibers by adding an alkaline-earth metal hydroxide, in particular calcium hydroxide, to the said agglomerated product.

The agglomerated product according to the invention is an agglomerated product based on metallurgical dust additionally containing fibers and at least one hydroxide of an alkaline-earth metal.

In one embodiment the agglomerated product in accordance with the invention contains less than 75% by weight, advantageously from 0.5 to 20% by weight, preferably approximately 10% by weight of alkaline-earth metal hydroxide.

The weight content of fibers in the agglomerated product is advantageously lower than 20%, preferably between 0.5 and 10%.

In an advantageous embodiment the agglomerated product contains water, the moisture content of the product in accordance with the invention being advantageously lower than 20% by weight, preferably lower than 10% by weight, in particular between 5 and 10% by weight.

The alkaline-earth metal hydroxide is preferably calcium hydroxide such as a calcium hydroxide obtained by slaking of 1 part by weight of CaO or of CaO.MgO with approximately 0.7–0.8 part by weight of water, optionally in the presence of additives such as an amine or an aminoalcohol. The calcium hydroxide may therefore be in the form $Ca(OH)_2.MgO$ or $Ca(OH)_2.Mg(OH)_2$.

Another subject of the present invention is a process for the preparation of an agglomerated product in accordance with the invention, in which a mixture of metallurgical dust, of fibers and of an alkaline-earth metal hydroxide is prepared and in which the said mixture is subjected to a compression.

Examples of fibers which can be employed in the product in accordance with the invention are: synthetic fibers such as glass fibers, carbon fiber, boron fibers, silicon carbide fibers, aramid, polyamide and phenolic fibers, polyalkyl (for example polyethylene, polypropylene) fibers, polyester fibers, acrylic, cellulosic, acetate, rayon and viscous fibers, fibers of vegetable origin such as sisal, jute, flax, cotton, wood, paper produced from wood, fibers of mineral origin such as asbestos, and metal fibers.

The fibers employed are preferably cellulosic fibers such as wood or paper fibers.

Metallurgical derivatives denote, among others, dry dust or dust of low moisture content (for example less than 10%) from the metallurgical industry, in particular from the iron and steel industry, such as slag, blast furnace dust, sludge obtained during the removal of dust from the fumes leaving converters (dust removal by a dry or wet route), and pulverulent or nonpulverulent products originating from catalysts containing metals employed in the chemical, in particular petrochemical, industry (cracking catalysts and the like).

As is known, the metallurgical derivative may be at the same time in the form of a dry (preferably pulverulent) powder and in the form of a sludge.

In the case of a powder, the mixture in the process according to the invention can be prepared merely by mixing or blending, for example, 10 parts by weight of metallurgical duet, less than 3 parts by weight of alkaline-earth metal hydroxide and at least one part by weight of fibers.

In the case of a sludge said mixture is advantageously prepared by mixing said sludge containing metallurgical dust with fibers and an alkaline-earth metal oxide (in particular CaO and CaO.MgO). In contact with water, the oxide is converted into hydroxide with drying of the sludge due, on the one hand, to the absorption of water and, on the other hand, to the evaporation of water, the latter being due to the heat released by the exothermic reaction.

The moisture content of the mixture is preferably adjusted to a value lower than 20%, preferably 10%.

This adjustment can be carried out by drying the metallurgical dust, but is preferably carried out by adding an appropriate quantity of an alkaline-earth metal oxide (for example CaO and/or CaO.MgO) so as to avoid the high costs inherent in a drying stage.

In the case of said sludge, in an embodiment of the process in accordance with the invention said mixture is prepared by means of CaO and/or MgO and fibers, in particular of CaO and/or MgO containing from 0.5 to 10% by weight of cellulose fibers.

Other special features and details of the invention will emerge from the detailed description of the following examples of preparation:

EXAMPLE 1

A powder originating from a byproduct of the treatment of catalysts containing, among others, molybdenum, nickel, vanadium and aluminum was dried until the moisture content of the powder was lowered to a value of the order of 5%.

This powder was next mixed with calcium hydroxide in the form of $(Ca(OH)_2.MgO)$ and paper fibers so as to obtain a mixture whose composition was as follows:

| | |
|---|---|
| powder (in dry form) | 78% by weight |
| moisture | 5% by weight |
| $Ca(OH)_2.MgO$ | 15% by weight |
| paper fibers | 2% by weight |

This mixture was next converted into a briquette or agglomerated product with the aid of a roller press, the pressure exerted on the mixture between the rollers being approximately 10 tons per linear centimeter of the rollers.

The agglomerated product had a relative density of 1.95 and a compressive strength of 2068N (crushing strength of the ovoid briquette between the platens of a press).

By way of comparison, agglomerated products containing no fibers and/or no $Ca(OH)_2MgO$ were prepared as described above, Table 1, which follows, gives the resilience and the relative density of various agglomerated products.

TABLE 1

| | Composition of the agglomerated product in % by weight | | | | Relative density | Compressive strength N |
|---|---|---|---|---|---|---|
| | Dust | Ca(OH)$_2$ | H$_2$O moisture | Fibers | | |
| 1 | 100 | 0 | 0 | 0 | 1.79 | 568 |
| 2 | 98 | 0 | 0 | 2 | 1.79 | 1078 |
| 3 | 93 | 0 | 5 | 2 | 1.95 | 1470 |
| 4 | 80 | 15 | 5 | 0 | 1.95 | 1078 |
| The invention | 78 | 15 | 5 | 2 | 1.95 | 2068 |

From this table it follows that the combined use of Ca(OH)$_2$.MgO and of fibers makes it possible to obtain an agglomerated product exhibiting a very high crushing strength when compared with that of an agglomerated product containing either Ca(OH)$_2$.MgO or fibers or containing neither. A person skilled in the art could not expect to obtain an agglomerated product exhibiting a compressive strength higher than 2000N, whereas the use of fibers or of Ca(OH)$_2$ alone made it possible to obtain only an agglomerated product whose compressive strength is lower than 1500N.

EXAMPLE 2

The operation was carried out as described in Example 1, except that the Ca(OH)$_2$.MgO content was 24% instead of 15%, The agglomerated product, whose composition was as follows: 69% metallurgical dust, 24% Ca(OH)$_2$.MgO, 2% of fibers and 5% of moisture, had the following properties:

relative density: 1.95
compressive strength: 2009N

These values are comparable with those obtained for the agglomerated product in accordance with the invention of Example 1.

EXAMPLE 3

A byproduct of treatment of catalysts containing molybdenum, nickel, vanadium and aluminum was dried by an instantaneous drying process. This byproduct was mixed in a plow head mixer of 80 liter capacity with fibers and an alkaline-earth metal hydroxide. A mixture exhibiting a good fiber distribution was obtained after 5 minutes.

The mixture thus prepared was next converted into cushion-shaped briquettes (45×40×25 mm) by means of a roller press with 3 cavities, the pressure exerted between the rollers being 12 tons per linear cm.

Agglomerated products of different composition were thus prepared. Table 3, which follows, gives the composition of said agglomerated products together with their relative density, their compressive strength and the fraction F in % of the products which have a particle size greater than 10 mm after 4 drops from a height of 2 m.

TABLE 2

| Composition (%) | | | | Paper fiber | Relative density | Strength newton | F % |
|---|---|---|---|---|---|---|---|
| Dust | H$_2$O | Ca(OH)$_2$ | Ca(OH)$_2$.MgO | | | | |
| 77 | 6 | | 15 | 2 | 2.18 | 2482 | 95.6 |
| 75.7 | 7.3 | | 15 | 2 | 2.18 | 2482 | 95.6 |
| 75.2 | 7.8 | | 15 | 2 | 2.22 | 3280 | 95.5 |
| 76.2 | 7.3 | | 15 | 1.5 | 2.16 | 2697 | 92.2 |
| 74.5 | 8 | | 15 | 2.5 | 2.18 | 3060 | 98 |
| 80.7 | 7.3 | | 10 | 2 | 2.19 | 2710 | 94 |
| 78.2 | 7.3 | | 12.5 | 2 | 2.21 | 2666 | 95 |
| 79.4 | 8.1 | 10 | | 2.5 | 2.21 | 3280 | 98 |
| 81.4 | 8.6 | 7.5 | | 2.5 | 2.17 | 3046 | 96.5 |
| 81.9 | 5.6 | 10 | | 2.5 | 2.16 | 3462 | 98 |

These tests show that the combined use of 15% Ca(OH)$_2$.MgO and of 2.5% of fibers (that is to say an agglomerated product containing approximately 10% of Ca(OH)$_2$.MgO calculated in the form of Ca(OH)$_2$ and 2.5% of fibers) or of 10% of Ca(OH)$_2$ and of 2.5% of fibers makes it possible to obtain optimum values of strength and for the factor F, and that a moisture content of approximately 7% for Ca(OH)$_2$.MgO and of approximately 6% for Ca(OH)$_2$ appear to be the optimum values for obtaining the best result for the strength and the factor F.

EXAMPLE 4

An agglomerated product was prepared as described in Example 1, except that the dust employed was a hematite dust which had a moisture content lower than 0.15% and that the compacting of 30 g of material in the form of a cylindrical prism of 3 cm diameter was performed under a pressure of 20 tons.

Agglomerated products containing various additives were thus prepared. Table 4, which follows, gives the composition of said agglomerated products, as well as their strength. The latter was measured by pressing a rod in the center of the cylindrical prism (breakage test).

TABLE 3

| Composition (by weight) | | | | Relative density | Strength N |
|---|---|---|---|---|---|
| Hematite | Moisture | Paper fibers | $Ca(OH)_2.MgO$ | | |
| 99.85 | 0.15 | | | 3.26 | 29 |
| 97.85 | 0.15 | 2 | | 2.97 | 304 |
| 66.85 | 0.15 | | 33 | 2.67 | 274 |
| 64.85 | 0.15 | 2 | 33 | 2.55 | 1205 |
| 63 | 2 | 2 | 33 | 2.36 | 1735 |

This table clearly shows that the combined use of a hydroxide of an alkaline-earth metal and of fibers, in particular in the presence of moisture, makes it possible to obtain agglomerated products exhibiting a compressive strength which is higher than that of an agglomerated product containing, as binder, either fibers or $Ca(OH)_2.MgO$.

We claim:

1. An agglomerated product based on metallurgical by-products consisting of:

2.5 to 3 % by weight, based on the total weight of product, of paper fibers;

5 to 10 % by weight, based on the total weight of product, of water;

$Ca(OH)_2$, the weight content being comprised between 9 and 25 % by weight, based on the total weight of product, and the remaining part consisting of metallurgical by-products.

2. The agglomerated product of claim 1 wherein $Ca(OH)_2$ is present in a range between 10 and 20 % by weight, based upon the total weight of product.

3. An agglomerated product based on metallurgical by-products consisting of:

about 2.5% by weight, based on the total weight of product, of paper fibers;

5 to 10 % by weight, based on the total weight of product, of water;

$Ca(OH)_2$, the weight content being about 10% by weight, based on the total weight of product, and the remaining part consisting of metallurgical by-products.

4. An agglomerated product based on metallurgical by-products consisting of:

2.5 to 3 % by weight, based on the total weight of product, of paper fibers;

about 10% by weight, based on the total weight of product of $Ca(OH)_2$;

from 5 to 8% by weight, based on the total weight of product, of water, and the remaining part consisting of metallurgical dust.

* * * * *